United States Patent
Cornils et al.

(10) Patent No.: US 6,824,722 B1
(45) Date of Patent: Nov. 30, 2004

(54) PROCESS FOR FASHIONING SUPERPOSED EXTRUDATE

(75) Inventors: Gerd Cornils, Merzenich-Girbelsrath (DE); Florian Fischer, Aachen (DE); Stefan Verbeek, Waldfeucht-Haren (DE)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/529,672

(22) PCT Filed: Aug. 18, 1999

(86) PCT No.: PCT/FR99/02010

§ 371 (c)(1),
(2), (4) Date: Apr. 18, 2000

(87) PCT Pub. No.: WO00/10793

PCT Pub. Date: Mar. 2, 2000

(30) Foreign Application Priority Data

Aug. 18, 1998 (DE) .......................... 198 37 348

(51) Int. Cl.$^7$ ............................... B29C 47/06
(52) U.S. Cl. ....................... 264/259; 264/280; 264/294; 264/296
(58) Field of Search ................................. 264/167, 259, 264/171.13, 171.15, 177.1, 177.17, 210.2, 280, 294, 296

(56) References Cited

U.S. PATENT DOCUMENTS

| | | | | |
|---|---|---|---|---|
| 5,057,265 A | * | 10/1991 | Kunert et al. ................ | 264/161 |
| 5,069,849 A | * | 12/1991 | Wain ........................... | 264/138 |
| 5,108,526 A | * | 4/1992 | Cornils et al. .............. | 156/108 |
| 5,382,395 A | * | 1/1995 | Hoenke ....................... | 156/108 |
| 5,456,874 A | * | 10/1995 | Cordes et al. .............. | 156/108 |
| 5,519,979 A | * | 5/1996 | Kunert et al. .......... | 296/146.15 |
| 5,571,461 A | * | 11/1996 | Scholl et al. ............... | 156/108 |
| 5,795,421 A | * | 8/1998 | Takahashi et al. .......... | 156/107 |
| 6,039,907 A | * | 3/2000 | Krumm et al. ............. | 264/161 |
| 6,138,338 A | * | 10/2000 | Berry .......................... | 264/152 |

FOREIGN PATENT DOCUMENTS

| | | | |
|---|---|---|---|
| DE | 3930414 A1 | * 3/1991 | |
| DE | 90 11 573.2 U1 | 9/1991 | |
| DE | 4326179 A1 | 8/1993 | |
| DE | 4326179 A1 | * 2/1994 | .......... C03C/27/04 |
| DE | 4445258 A1 | * 6/1996 | .......... B29C/00/00 |
| DE | 19537693 C1 | * 10/1996 | .......... B29C/45/14 |
| DE | 19604397 C1 | * 7/1997 | .......... B29C/47/02 |
| EP | 0524060 A1 | * 1/1993 | |
| EP | 0787 576 A2 | 8/1997 | |
| JP | 8-276513 | 10/1996 | |

OTHER PUBLICATIONS

English translation of DE 43 26 179 A1.*

* cited by examiner

Primary Examiner—Mark Eashoo
(74) Attorney, Agent, or Firm—Oblon, Spivak, McClelland, Maier & Neustadt, P.C.

(57) ABSTRACT

In a process for fashioning a portion of a profiled bead (2), which has been extruded onto an object, in particular a pane (1), fastened in a treatment station (E), in which process an initially shapeless accumulation of material (4) is produced in the portion in question, which accumulation of material is given a final shape corresponding to the uniform cross section, of the profiled bead (2) by means of a moving tool (5), any excess material being expelled in order to be removed, the mass of material (4) is produced by the superposition of two portions of the extruded strip, the second portion being deposited after the die (D) has been moved and repositioned. Advantageously, the tool (5) is, according to the invention, automatically aligned on the profiled bead (2), immediately after the accumulated material (4) has been extruded and after the extrusion die (D) has continued its travel, without moving the object, and is brought into contact with this bead. Also described is a device especially suitable for implementing this process.

27 Claims, 6 Drawing Sheets

PROCESS FOR FASHIONING SUPERPOSED EXTRUDATE

BACKGROUND OF THE INVENTION

The invention relates to the field of the manufacture of objects provided with profiled elements made of plastic, such as windows provided with ornamental or sealing strips. It relates more particularly to a process for fashioning a portion of a profiled bead extruded onto an object, and to articles resulting therefrom, as well as to a device especially designed to implement this process.

It is generally known to deposit profiled beads of polymer, for example along the edge of a pane, by continuous extrusion, and to use them directly as a sealing strip, especially for windows fitted into a frame by bonding. Suitable sections of strips help, on the one hand, to centre the window when fitting it into a frame or chassis, for example into a body opening, and guarantee, on the other hand, the position of the window while the adhesive usually employed is curing. Compared with the injection moulding of such strips, which is also known, extrusion has the advantage of greater flexibility since it is not necessary to keep a specific mould for each shape of pane, but all that is required is to guide an extrusion die of calibrated cross section along the edge of the pane, the extrusion die being controlled by a programmable robot, with a defined, generally continuous, flow of material.

Sometimes it is also required to cover corner parts in the window opening with the bead of the sealing strip. Compared with the main cross section of the profiled bead, which is fixedly predetermined by the calibrated shape of the extrusion die, more material is needed in such corner regions. According to Patent DE-C-196 04 397, there exists an extrusion die whose cross section can automatically increase in the corner regions of a pane. Furthermore, the die comprises two channels for supplying the polymer, in each of which the volume flow rate may be controlled independently of one another by valves. Overall, the additional material needed compared with the bead of normal profile is extruded in a continuous path with the desired cross section. However, such a die is very expensive to manufacture.

It is also known to subsequently touch up the extruded strip in such regions where modification of the profile is required, or in "critical" regions such as the join region between the start and end of the extrusion.

Certain existing solutions thus modify the cross section of the bead by cutting off a defined portion of the bead in a corner region or join region and by filling the gaps thus created by injecting an additional material which joins up with the profiled bead (EP-B 0,524,060), or add additional material for filling the corners by injection onto the continuous profiled bead of uniform cross section in a work phase after the extrusion (cf. DE-C-195 37 693).

In practice, the windows have hitherto been removed from the extrusion station before the profiled bead is touched up and are repositioned in a separate touch-up station. The extrusion station therefore has the best possible occupancy since, before injection of additional material or partial cutting and filling of the gap created, it is necessary to wait for a hold time until the extruded material has stabilized sufficiently.

It is also already known, from Patent DE 4,445,258 C2, to touch up the join region between the start and end of a profiled bead made of extruded polymer surrounding the edge of a pane by means of a multipart compression mould which executes a closure movement going from the centre of the pane towards the external edge so that the excess material in the join region is expelled to the outside and is detached therefrom by a cutting edge carried by the compression tool. However, the particular direction of operation of that known device leads to a bulky system for which there is not enough space in the immediate vicinity of an extrusion station. Thus, all the windows in that device must also be refitted and repositioned separately.

Another known postforming tool (DE-U-90 11 573) for profiled beads of extruded polyurethane is also designed in such a way that the panes must be positioned with respect to the device and cannot therefore be touched up directly in the extrusion station.

Touch-up processes with transfer of the window furthermore have the drawback that the solutions proposed do not always give exactly the expected result with, in particular, visible transition marks on the postformed region which are due to the addition of fresh material alongside the earlier extruded material which has already at least partially cured.

It is therefore desired to find improved processes, with a more reliable appearance result, preferably by reducing the cost compared with that currently borne, in the techniques using postforming or filling especially by injection moulding, by the succession of steps of transferring each window provided with the moulded profiled bead out of the extrusion station, of fitting and positioning the following touch-up station and finally of fashioning the critical portion.

Thus, the object of the invention is to present a process which markedly improves the touching-up, in particular by decreasing the hold time for the postforming of critical regions of a profiled bead, especially corner regions and/or join regions. A corresponding device, which is also advantageously as compact as possible, especially suitable for implementing this process, may also be proposed.

SUMMARY OF THE INVENTION

The subject of the invention is thus a process for the fashioning of a portion of a profiled bead extruded onto an object, in particular a pane, in which process an initially shapeless mass of material is produced in the portion in question and is given the desired final shape by contact with a shaped surface of a moving tool, any excess material being automatically expelled from the tool in order to be removed, characterized in that the mass of material is produced by the superposition of two segments of the extruded strip, with the following steps:

- the extrusion die is guided along a first segment of the intended path of the profiled bead, including the portion to be fashioned;
- the die is taken away from the object and is moved, relative to the object, to an adjacent position of the portion to be fashioned;
- the die is guided again, along a second segment of the path of the profiled bead, also including the portion to be fashioned.

The process according to the invention is characterized by the fact that material needed for the final fashioning is supplied directly at the time of extrusion, so that after the die has left the region in question, the touch-up operation can be started at the same time as the extrusion stops.

The saving in production time represents a certain economical advantage.

Furthermore, since the touch-up operation is started immediately, any difference in appearance between the region which is extruded ir the usual manner and the region which has undergone the additional treatment is lessened, since the material of the extruded part has not yet been cured and/or crosslinked significantly by the time the fashioning of the adjacent part is started.

This process is particularly useful for the local production of particular shapes in limited regions of the strip, in particular for corner regions which are more difficult to produce the more acute-angled the corner.

According to one particular embodiment for fashioning a corner, especially an acute-angled corner, the die is moved relative to the object by changing the relative orientation of the die with respect to the object, especially by rotation through the desired angle, and the die is guided, in the new direction thus obtained, along the following side of the object.

In one particular case, the first and/or second segment extend/extends beyond the perimeter of the object so that the fashioned portion projects beyond the end face of the object.

In general, it is not necessary to interrupt the flow of material during intermediate movement of the die.

According to an advantageous variant, the accumulation of material is formed by moving the die, after the first segment has been extruded, by passing it over that region of the first segment which includes the portion to be fashioned. In the region in question, the material thus forms a kind of ribbon folded back on itself, in which the superposed layers (or folds) adhere perfectly to each other.

In this regard, the subject of the invention is also novel products, especially:

an article, especially a window, comprising an object provided with a profiled bead extruded onto the object and having a fashioned portion, characterized in that the fashioned portion consists of a continuous folded ribbon of extruded material, in which ribbon the opposed surfaces of the fold or folds adhere to each other along a possibly pellicular interface, which ribbon is fashioned by contact with a shaped surface;

an article, especially a window, comprising an object, especially a pane, provided with a profiled bead extruded onto the object and having at least one corner portion, characterized in that at least one corner portion consists of the superposition of at least two partial beads which adhere to each other along a possibly pellicular interface, which superposed bead portion is fashioned by contact with a shaped surface.

In fact, depending especially on the plastic used, on the extrusion rate, on the ambient temperature or the ambient moisture content, the material deposited on the first partial bead may be partially modified before the material of the second partial bead has been superposed on it. Thus, the plastic in the fashioned region is in general relatively heterogeneous, although giving the bead sufficient cohesion by the respective layers adhering to each other.

In extreme cases, there may even form on the surface of the first partial bead a kind of skin or film which is completely compatible with the material deposited on top of it just afterwards, but which may be visible if a longitudinal section of the product is examined.

The extruded material is advantageously of the thermoplastic type, for example a thermoplastic elastomer (TPE) or a thermoplastic olefin (TPO). Materials not having an excessive tack are preferred so as to facilitate the fashioning operations, especially the removal of the shaped surface.

With thermoplastics, it may be advantageous to heat the bead portion or portions to be fashioned before and/or during the fashioning.

The object of the invention is also a device for the fashioning of a portion of a profiled bead extruded onto an object—in particular onto a pane—fastened in a treatment station, in particular for implementing the process according to the invention, in which device a moving calibrated tool may be brought into contact with the said strip portion, comprising in initially shapeless accumulation of material, and applies against the latter a shaped surface corresponding to the uniform profile of the profiled bead, and in which device means are provided for cutting and removing the excess material, being characterized by the fact that the tool is connected in a locally adjustable manner to the treatment station provided for laying down the profiled bead and can be moved between a rest position and a working position in contact with the object fastened in the treatment station, by means of an actuating device, and in that means are provided for the correct and automatic adjustment of the relative position between the tool and the object.

According to a preferred embodiment of the invention, the postforming device will be automatically positioned directly after the extrusion of an accumulation of material at the respective critical point along the profiled bead, after the extrusion die has continued its travel without the window to be treated having been transferred and also before the extruded material has been cured, in order to give the desired dimensions to that region of the profiled bead in question, so that it matches, without any transition, the dimensions of the adjacent portion of profiled bead being formed, while any excess material will be expelled and automatically removed.

Thus, for the same occupancy of the extrusion station, a substantial time saving will be obtained in the subsequent treatment of the critical regions of the profiled bead as they can now be formed in line during the continuation of the extrusion process, and therefore without additional handling of the window which is positioned only once in the extrusion station.

Further advantages of the process are a substantial reduction in the risk of damage when handling the windows and a reduction in or even elimination of the costs of touching up for removing the excess material from the bead. Finally, the need for space for the additional touch-up station in the manufacturing plant also disappears.

In the case of filling corner regions, according to a development of the process, the necessary accumulation of material will be produced by taking the extrusion die away from the edge of the window, rotating it and applying it again at the point of separation by superposing two profile portions. Because of the plasticity of the material, the accumulation is initially shapeless. However, just after the extrusion die has continued its travel, it will be adjusted to the cross section of the profiled bead by means of the automatically positionable tool.

Further features and advantages of the subject of the invention will emerge from the following detailed description and the illustration of an example of the implementation of a process and of an embodiment of a device according to the invention.

In the example of the postforming of a corner of a profiled bead made of thermoplastic elastomer (TPE) which is deposited on a window:

DETAILED DESCRIPTION OF THE INVENTION

Figure 1:
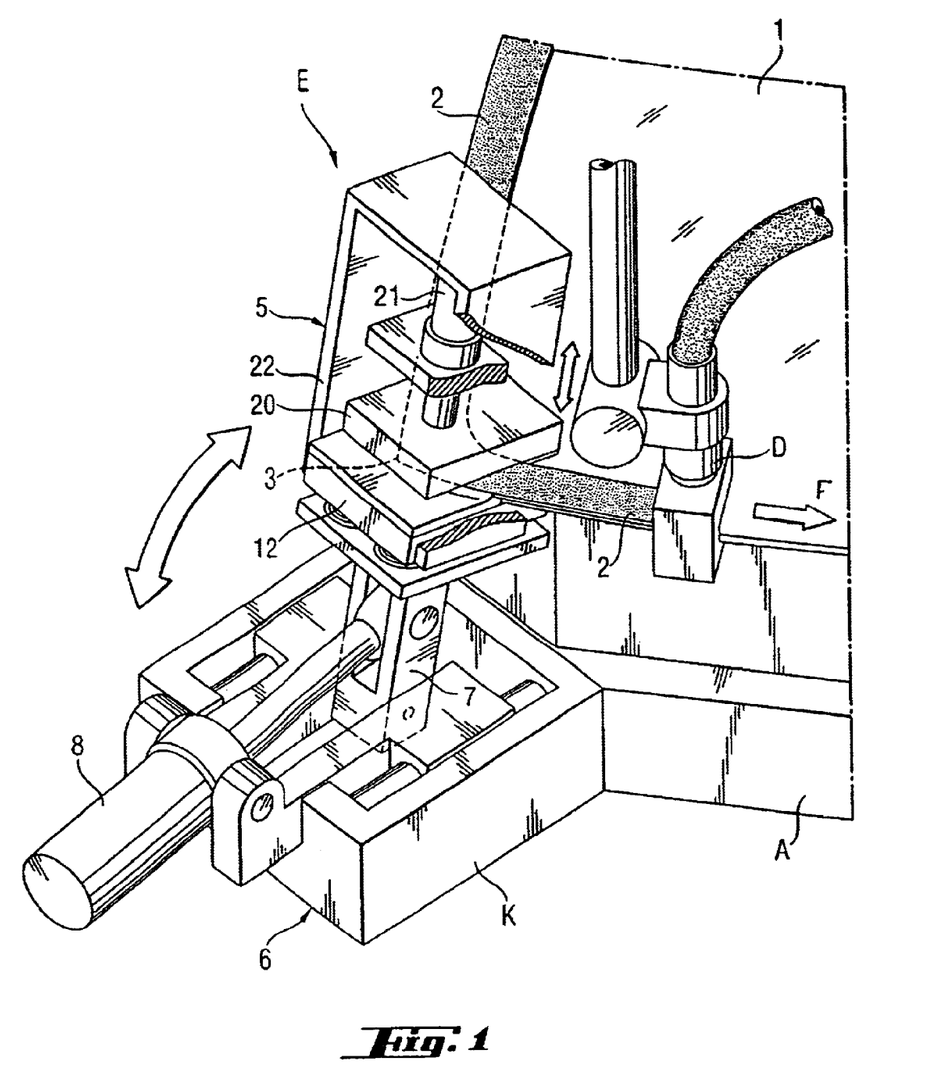
FIG. 1 shows a detail of an extrusion station with which a postforming device is associate

In FIG. 1, a pane 1, for example made of monolithic toughened safety glass, is positioned and fixed in an extrusion station E. Also included in this figure, purely schematically, are a support A as well as an extrusion die D which is controlled by a robot. This extrusion die deposits, directly along one edge, a profiled bead 2 of thermoplastic elastomer (TPE) on the upwardly facing main face of the pane 1. Its direction of movement is implicated by an arrow F pointing to the right. It is approximately parallel to the edge of the pane 1. A postforming tool 5, forming part of the extrusion station E, is placed at at least one of the corners of the pane 1. Here, it is connected to the support A by a bracket K, which is merely sketched. Thus, it can work directly on the profiled bead 2 extruded by the die D. The pane need therefore no longer be firstly removed from the support A and then repositioned. A more detailed description of this postforming tool 5 and of its method of operation is given below.

Figure 2:
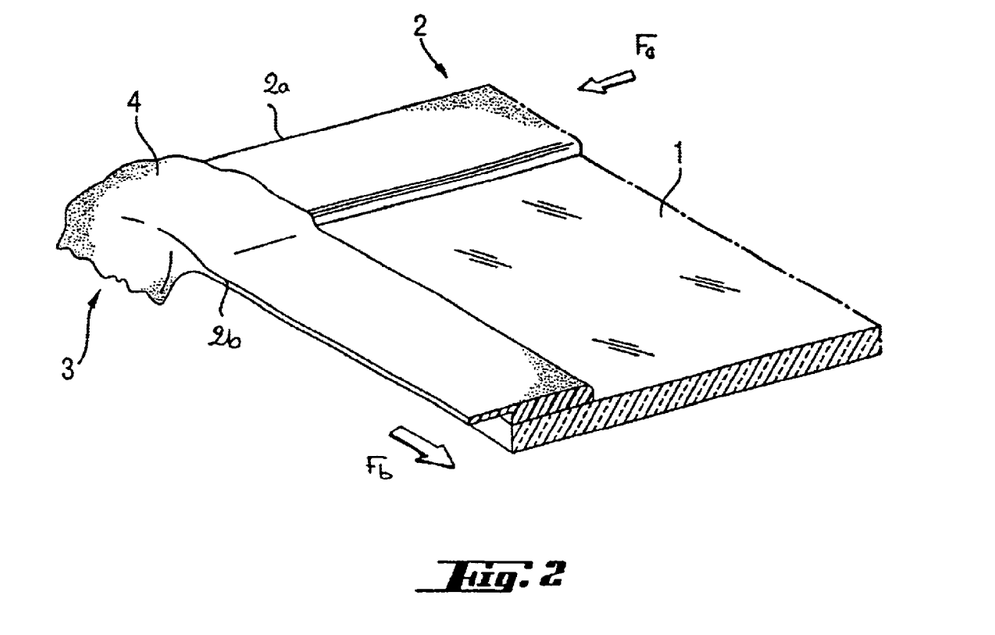
FIG. 2 is a view of the corner region immediately before a profiled bead that has just been extruded is postformed.

In FIG. 2, an accumulation 4 of TPE has been produced at a corner 3 of the pane 1. In the present case, the die D, being guided along a first side of the pane in the direction of the arrow Fa, has for this purpose been brought beyond the corner 3 when it has reached the corner region and has been taken away from the edge of the window. Thus, a first bead segment 2a is formed, which includes the portion to be fashioned into a corner. Next, the die is rotated and again placed on the same corner 3. By guiding the die in the new direction of advance along the following side, in the direction of the arrow Fb, a second bead segment 2b is formed. It is not necessary to interrupt the extrusion process when transferring the die.

The extrudate is therefore applied twice in a limited region, in this case crossing the superposed portions, in a comparable manner at the start and end of the profiled bead, except that the deposition of the upper portion follows immediately the deposition of the lower portion. The bead portion 2b deposited last is on top. However, its material can mix with the covered portion 2a which has not yet been cured.

This produces an accumulation of material 4 which initially is shapeless and is illustrated here purely schematically.

Depending on the speed of movement of the die and the curing kinetics of the extruded material in particular, this shapeless mass, which may have approximately the shape of a ribbon folded back on itself when the flow of polymer has not stopped during transfer of the die, may contain, at the interface between the superposed portions, possibly between the folds of the ribbon, a pellicular interface due to very limited curing of the material, which pellicular interface in no way impairs the mutual adhesion of the segments 2a and 2b and therefore the cohesion of the fashioned region 3, despite its relatively heterogeneous internal structure.

Figure 3:
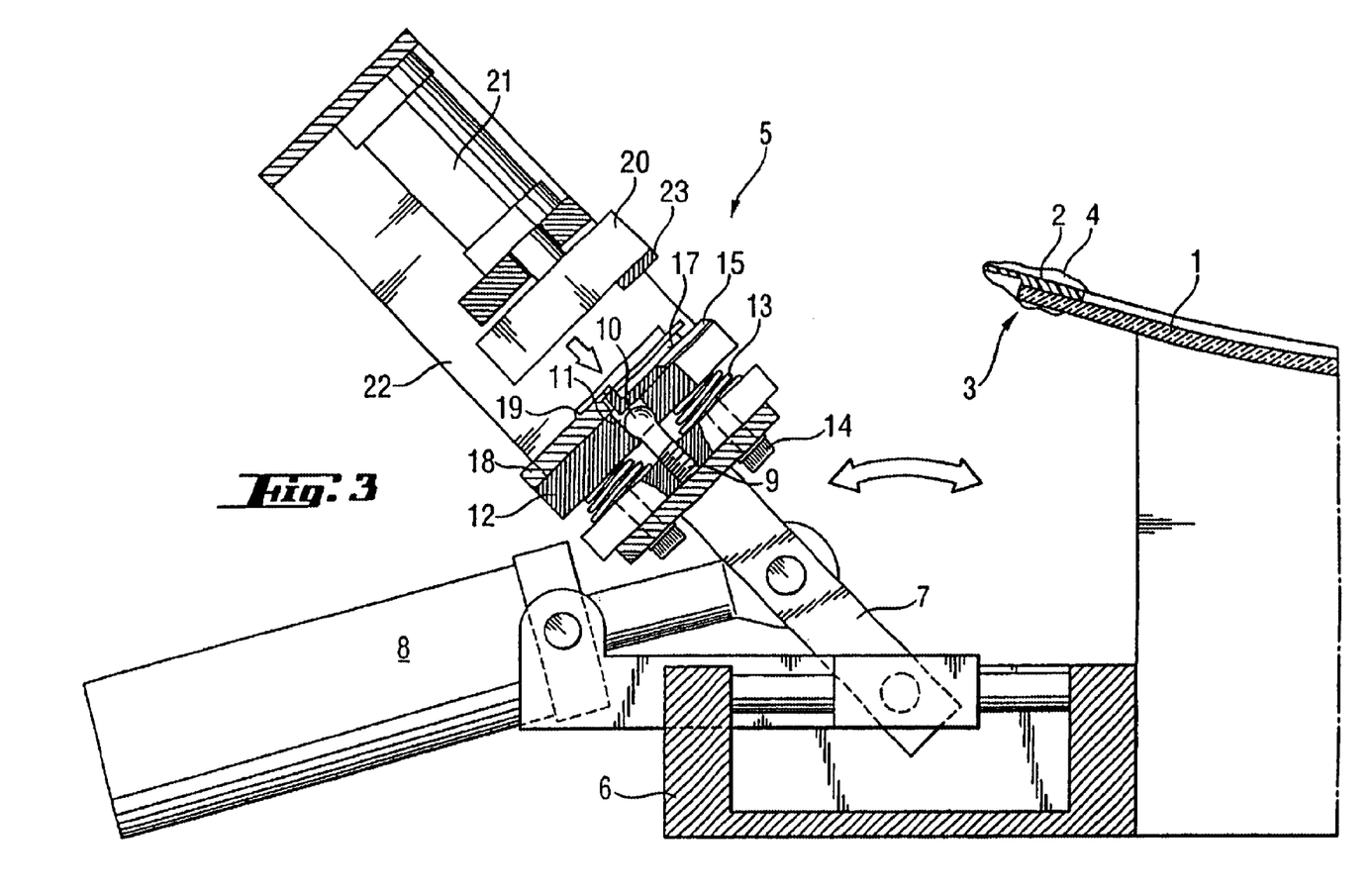
FIG. 3 is a view of an embodiment of the postforming tool with an actuating device for applying the tool to the window.
Figure 4:
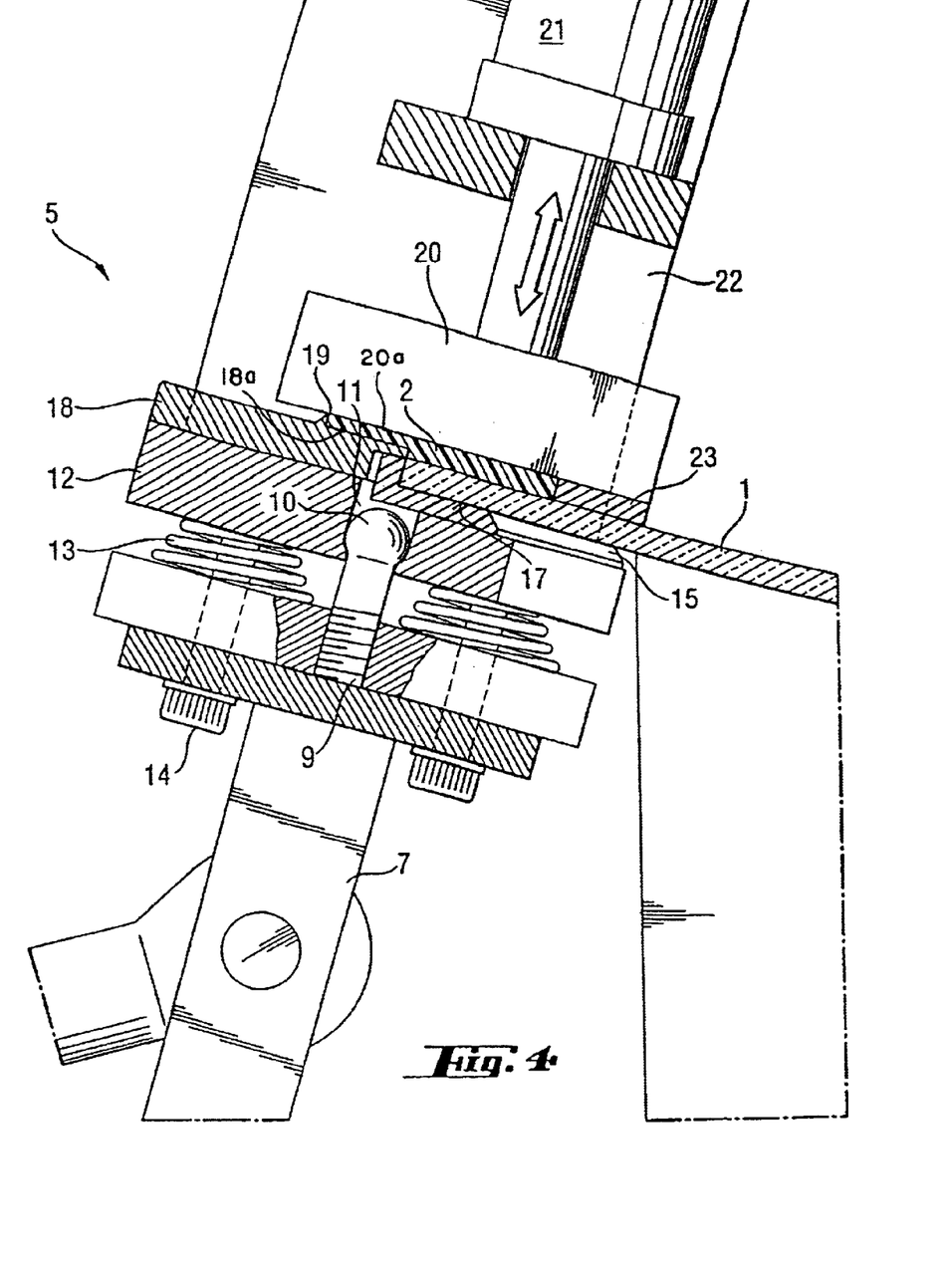
FIG. 4 is a partial sectional view of the postforming tool in FIG. 2, which is in the working position on the window and on the profiled bead.
Figure 7:
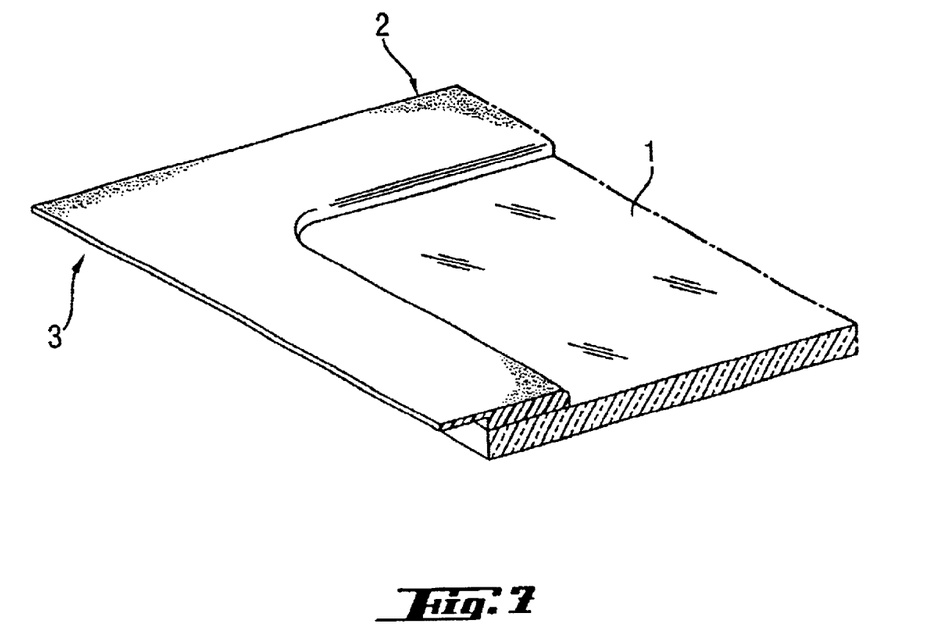
FIG. 7 is a view of the corner region of FIG. 1 after the postforming.

Just after the extrusion die has left this corner region, to continue applying the profiled bead 2, the tool 5 is transferred from its rest position, illustrated in FIG. 3, to its working position, illustrated in FIG. 4, by a tilting movement, this taking place well before the end of the extrusion process, and therefore without the position or location of the window 1 having to be changed. Although any collision between the die D and the tool 5 is excluded in the rest position, the working position—as clearly shown in FIG. 1—lies in the working region of the extrusion die. In the working position, the tool 5 is brought into contact with the pane 1 and with the profiled bead 2 which can still be fashioned. It gives the accumulated material 4, which may still be seen in FIG. 3, its shape and produces the final configuration of the corner of the profiled bead 2, as illustrated in FIG. 7.

Since the time between the formation of the shapeless mass 4 and the action of the tool 5 is very short, there is no significant surface curing of the bead and the shaped surface of the tool 5 leaves virtually no trace on either side of the mould at the boundary of the fashioned region, this being an appreciable advantage over the known processes.

An even more detailed discussion of the features of the tool 5 and of its method of operation will be given below. As support 6 for the tool, it is preferred to use a table, or an equivalent, which is firmly connected to the extrusion station E (support A and bracket K in FIG. 1). The support frame 7 of the tool is movable, in this case swinging about a pin connected to the base 6. An actuator 8, which here is illustrated by a pneumatic cylinder, is fastened to the support frame 7 and causes the tool 5 to undergo a to-and-fro motion between the working and rest positions.

In addition, the position of the tool is completely adjustable within the station so that various shapes of panes can be treated. The adjustment is illustrated here by the slideways of a carriage. However, the adjustment can also be made in any other suitable manner. Of course, such a tool 5 may be placed, if necessary, at each corner of the pane in the extrusion station. Should, for example, several corners in a profiled bead be requested by the window's purchaser, the corresponding number of compact postforming tools would then preferably be attached to the extrusion station in order to achieve the time-saving advantage associated with the invention.

In the FIG. 3, the postforming tool is open, while FIG. 4 shows it in the process of working with the closed mould parts. The latter grip with the edge of the pane 1 on three sides and therefore completely enclose the profiled bead 2 in a manner known per se. As is apparent in FIG. 1, the movement of the tool 5 towards the pane 1 is preferably executed approximately in the direction of the bisector of the angle at the corner 3.

In the embodiment illustrated, a swivel 9 with a spherical head (ball) 10 rises up from the support frame 7 towards the tool. This ball is set in a recess 11 in a baseplate 12 of the tool. The said baseplate is flexibly supported, some distance from the support frame 7, by means of bearing springs 13 (formed here by conical helical springs). It is therefore mounted on the support frame 7 while still being able to move in the three directions about the centre of the ball 10. Furthermore, it can be oriented (rotated) in its main plane, at least in a limited fashion. The bearing springs 13 centre it in an initial position. The angular position of the baseplate 12 with respect to the support frame 7 may be preset by means of set screws 14 which are inserted through the bearing springs 13. A temperature probe (not illustrated) may be mounted on the baseplate and serve for regulating a device for heating or for maintaining the temperature of the baseplate.

It is generally advantageous to heat the postforming tool for postforming the thermoplastic elastomers. In particular, it may be useful for the joining regions of the portion of profiled bead to be postformed also to be kept hot so as to obtain a smooth a join as possible. However, the heating cost is not high in the case of the process discussed here, because, between depositing the accumulation of material and the postforming, only a very short time interval has elapsed and the profiled bead has therefore not yet cooled.

Figure 5:
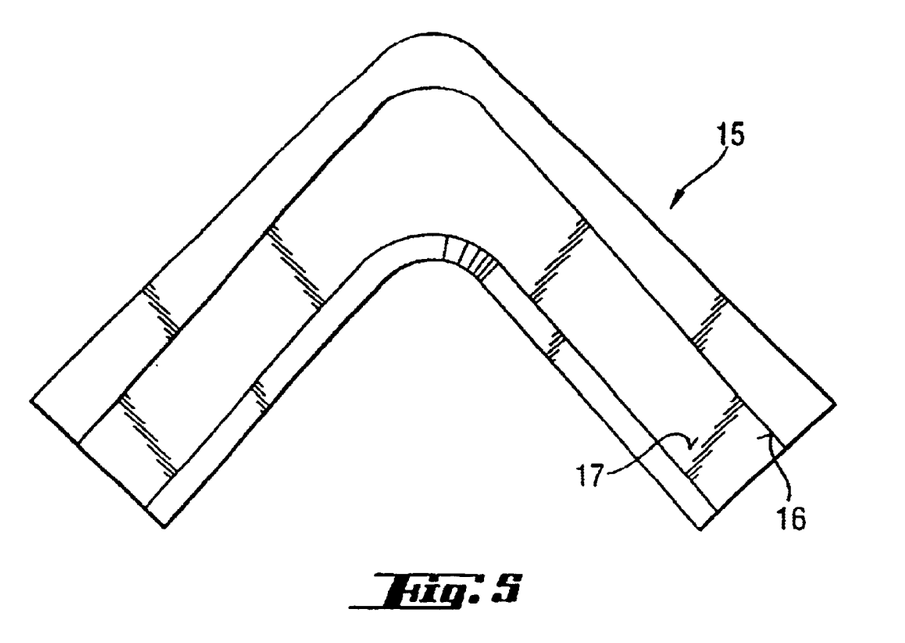
FIG. 5 is a view of a stop provided for adjusting the postforming tool on the end face of the window—a detail of FIG. 3.

A removable stop 15 is solidly attached to the baseplate 12. An enlarged complete view of it is given in detail in FIG. 5. The stop clearly forms a dihedron in the sketch. Machined on the upper face of the stop is a sealing rim 16 which is exactly matched to the corner 3 of the pane 1 as well as to the mould for touching up the peripheral end face of the latter. For this purpose, this sealing rim may in particular be provided with a groove. It gradually transforms into a laying surface 17. A chamfer is provided along the outer edge of the laying surface 17, as an engagement bevel for applying the stop 15 against the pane 1.

In FIG. 4, it may be clearly seen that the sealing rim 16 is applied against the external edge (end face) of the pane 1 in the working position of the tool 5. The laying surface 17 is placed flat against the underside of the pane and thus aligns the tool 5 in the plane of the edge of the pane. For this process, no specific driving means is required. As reproduced in the illustration, the profiled bead is applied, by the extrusion die, exactly on the top side of the pane 1 so that, when the stop 15 is engaged on the pane 1, no polymer material can be jammed between its peripheral end face and the sealing rim 16.

Thus, when the tool is brought and pressed against the pane by the actuator 8, the baseplate 12—and therefore the entire tool 5—may, together with its movable assembly, be automatically matched precisely to the position of the pane and to any dimensional discrepancies in the cutting and the size of the end faces of the pane.

The stop 15 is preferably composed of a low-friction plastic, for example PTFE, since the stop comes up against the pane 1 from below during tilting of the tool and slides along this underside. The tilting movement may, in general, be also illustrated by a straight insertion movement. Preferably, the tool is then applied obliquely from the side of the pane not provided with the profiled bead.

Figure 6:
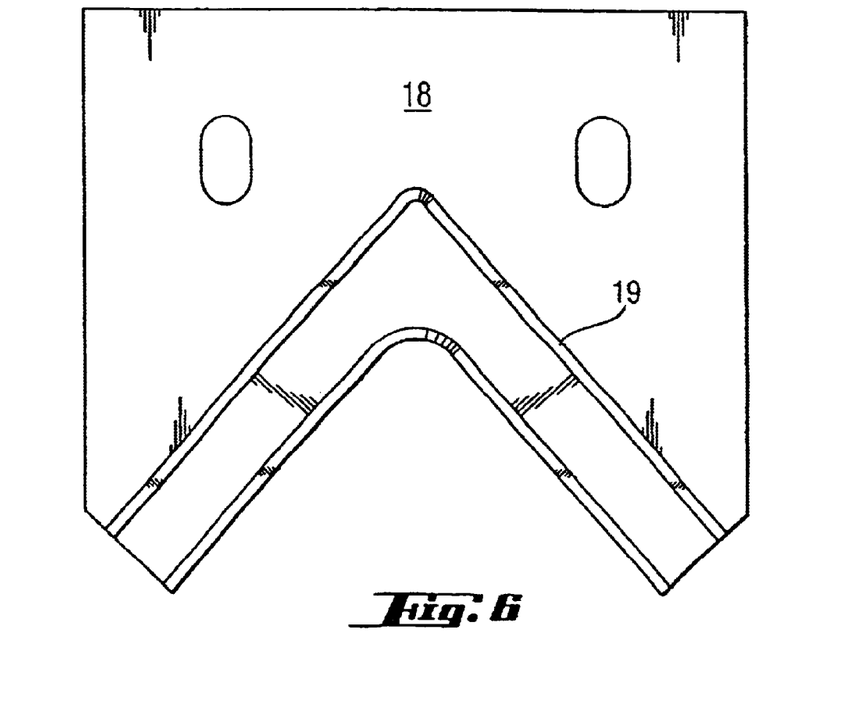
FIG. 6 is a view of a lower part of the mould with a cutting edge provided for cutting the excess material—a detail of FIG. 3.

A lower mould part 18, an enlargement of which is illustrated in the sketch in FIG. 6, is furthermore fastened to the baseplate 12. As mentioned above, the profiled bead 2 is only on the top side of the pane 1, with a lip overhanging the perimeter of the pane, and there is no contact with the peripheral end face. The extrudate to be applied must be sufficiently viscous to allow such shaping. The lower mould part 18 is fastened, with respect to the stop 15, in such a way that it supports, from underneath, the region to be postformed (lips) of the profiled bead 2 and at the same time completely covers the stop 15 with respect to the extruded mass. Formed on its usually smooth upper face is a cutting edge 19 having a sawtooth cross section. Its abrupt flank (of steepest slope in relation to the plane of the pane) is directed towards the profiled bead, and its height corresponds to the desired thickness of the projecting lip of the profiled bead 2. As may be seen in the sketch, the lower mould part makes an angle, the internal side of which once again follows the profile of the end face of the pane at a constant distance from the corner region.

As the upper part of the mould, the tool 5 additionally comprises a punch 20 which may be raised and lowered with respect to the baseplate 12 using a cylinder 21. A rigid connection 22 between the cylinder and the baseplate guarantees that the punch 20 exactly follows the engagement movement as the tool 5 is being applied against the pane 1. On the essentially flat moulding face of the punch 20 there is a gasket 23 applied as an additional thickness to the face of the punch. The thickness of the gasket is predetermined by the desired height of the profiled bead 2 on the pane 1.

In the rest position and during transfer of the tool into its working position, the punch 20 is raised. The opening between the punch 20 and the lower mould part must be large enough for the raised punch 20 and the gasket 23 not to come into contact with the profiled bead 2 while the tool is being brought into the working position.

After the tool has been automatically aligned on the corner of the pane, the punch 20 is lowered onto the pane 1 using the cylinder 21. Thus, the gasket is placed directly on the top side of the pane 1. In the region of accumulation of material, i.e. in the acute angle, a cavity or tunnel is now formed which is open on either side of the corner 3 and the cross section of which corresponds to the normal profile of the profiled bead and is bounded or circumscribed by:

the top side of the pane (on the contact surface provided);

the surface of the lower mould part, shown for example in FIG. 4 as upper portion 18a of mould part 18, as far as the end of the cutting edge (below the lip);

the lower face of the compression punch, shown for example in FIG. 4 as lower portion 20a of punch 20, as far as the gasket; and the perimeter of the gasket lying on the side facing the edge of the pane.

Along its longitudinal direction, the cross section of this tunnel or cavity may be of any desired shape, so that it is possible to obtain, in particular, the desired fashioning in the corner region with a corner-shape distended lip, as is illustrated in FIG. 7. If necessary, the corner region may also be fashioned with a rib or the like running along the upper face of the profiled bead.

The abovementioned outer perimeter of the gasket 23 thus serves for forming and limiting the edge of the profiled bead 2, facing the middle of the pane, in the corner region. It thus also makes an angle which corresponds to the apex angle of the lower mould part and is aligned precisely with the latter. However, in the corner region, this break is sufficiently rounded so that a small expulsion space is formed between the region of material accumulation 4 and the front edge of the gasket. The material expelled towards the middle of the pane during the postforming can fill this space. On the other side, lying beyond the pane 1, the excess material which is expelled into the abovementioned cavity is cut off between the cutting edge 19 and the lower face of the punch 20 and falls out of the tool at the latest during return of the latter to its rest position. Prototypes have demonstrated that, in general, no residue of material continues to adhere to the cutting edge, and that remnants that have adhered may easily be removed. However, the cylinder 21 of the punch 20 must not exert excessively high forces, so that the rigid connection 22 need no longer be of a particularly robust design.

Moreover, the stop 15, the lower mould part 18 with the cutting edge 19 and the face of the punch 20 with the gasket 23 are components of the tool which must be manufactured specifically for each shape of pane or each corner shape, whereas all the other components of the tool may be standardized for all shapes of pane. The thickness of the gasket 23 and the height of the cutting edge 19 with respect to the surface of the mould part 18 determine, with the greatest accuracy, the distance between the punch 20 and the pane 1 and therefore the thickness of the postformed corner region of the profiled bead 2.

This therefore results overall in a compact and relatively lightweight construction of the tool 5, which may consequently be assembled at an existing extrusion station without having to be overly modified.

The process and the device have admittedly been described in the case of extrusion onto a pane, but it goes without saying that profiled-bead postforming by extrusion applied to other objects and materials can also be carried out in the manner described without fundamentally departing from the steps mentioned here.

We claim:

1. A process for the fashioning of a portion of a profiled bead extruded along an intended path onto an object, wherein an initially shapeless mass of material is produced in the portion and is given a desired final shape by contact with a shaped surface of a moving tool, with any excess material being automatically expelled from the tool in order to be removed, the improvement wherein the mass of material is produced by the superposition of two segments of the extruded strip, comprising:

guiding an extrusion die along a first segment of the intended path of a profiled bead, comprising the portion to be fashioned;

moving the die away from the object and, relative to the object, to an adjacent position of the portion to be fashioned; and guiding the die along a second segment of the path of the profiled bead, also comprising the portion to be fashioned wherein an extrudable material continues to be delivered during said moving the die away from the object and, relative to the object, to an adjacent position of the portion to be fashioned step.

2. The process according to claim 1, wherein the die is moved relative to the object by changing the relative orientation of the die with respect to the object, and by guiding the die in the new direction thus obtained to fashion a corner in the profiled bead.

3. The process according to claim 2, wherein at least one of the first and second segment extends beyond the perimeter of the object so that the fashioned portion projects beyond an end face of the object.

4. The process according to claim 1, wherein after the first segment has been extruded, the die is moved by passing it over a region of the first segment which comprises the portion to be fashioned.

5. The process according to claim 1, wherein the moving tool is applied against the portion to be fashioned just after the die has left that region of the second segment which comprises this portion, in the actual extrusion station, without the object being moved, transferred or repositioned.

6. The process according to claim 5, wherein the moving tool is automatically brought from a rest position to its working position immediately after the mass has been extruded and the extrusion die has continued its travel, is automatically aligned with the profiled bead and is brought into contact with the shapeless mass in order to fashion it.

7. The process according to claim 1, wherein the object is a pane.

8. The process according to claim 2, wherein the die is moved relative to the object by rotation through a desired angle.

9. A process for using a tool to fashion extrudate on a pane comprising:

applying extrudate along a first segment of the pane;

applying extrudate along a second segment of the pane, with the second segment extruded on at least a portion of the first segment and the extrudate forming a superposed region defined by contact between the segments;

allowing a shaped surface of the tool to contact and fashion the superposed region;

wherein the extrudate is applied to the first and second segments by an uninterrupted extrusion.

10. The process of claim 9, wherein the extrudate is applied by an extrusion die.

11. The process of claim 9, wherein the extrudate comprises a profiled bead.

12. The process of claim 9, wherein the superposed region is fashioned into a first portion for curing and a second portion for removal.

13. The process of claim 12, further comprising: removing the second portion of the superposed region.

14. The process of claim 9, wherein the first and second segments are disposed proximate at least one edge of the pane.

15. The process of claim 9, further comprising: heating the tool.

16. The process of claim 9, wherein the shaped surface comprises an upper portion and a lower portion.

17. The process of claim 16, further comprising:

allowing a portion of the extrudate to flow between the upper and lower portions of the shaped surface to form a lip.

18. The process of claim 9, wherein the superposed region is disposed proximate two edges of the pane.

19. The process of claim 9, further comprising:

moving the tool from a first position remote from the superposed region to a second position proximate the superposed region.

20. The process of claim 9, further comprising: aligning the tool with the superposed region.

21. Process for working a portion (3) of a profiled strand (2) extruded on a window (1), in which an initially shapeless material mass (4) is produced in the portion (3) by superimposing two extruded profile segments (2a, 2b) and is shaped to a desired final shape by contact with a shaped surface of a mobile tool (5), with any excess material being automatically forced back out of the tool for removal, wherein the mobile tool (5) is applied to the portion (3) to be worked just after the extrusion die (D) has left the area of the second segment (2b) comprising said portion, in an extrusion station (E), without displacement, transfer or repositioning of the window (1);

wherein the mobile tool (5) is automatically brought from a rest position into a working position immediately following extrusion, and the extrusion die (D) is automatically aligned with the profiled strand (2) and is brought into contact with the shapeless material (4) in order to work the shapeless material (4).

22. The process according to claim 21, wherein the material mass (4) is produced with the following stages:

the extrusion die (D) is guided along a path of the first segment (2a) provided for the profiled strand (2) comprising the portion (3) to be worked;

the extrusion die (D) is moved away from the window (1) and the extrusion die (D) is displaced relative to the window (1) towards a position close to the portion (3) to be worked, passing above the first segment (2a) proximate the portion (3) to be worked;

the extrusion die (D) is guided along a path of the second segment (2b) of the profiled strand (2) proximate the portion (3) to be worked.

23. The process according to claim 22, wherein the material mass (4) is further produced with the following stage:
   displacing the die (D) relative to the window (1) while changing the relative orientation of the die (D) with respect to the window (1) by rotation in accordance with a desired angle, wherein the die (D) is guided to work an angle (3) in the profiled strand (2).

24. The process according to claim 23, wherein at least one of the first segment (2a) and second segment (2b) extends beyond a periphery of the window (1), so that the worked portion (3) projects beyond an edge of the window (1).

25. The process according to claim 21, wherein material extrudable by the die (D) continues to be supplied on displacing the die.

26. Process for working a portion (3) of a profiled strand (2) extruded on a window (1), in which an initially shapeless material mass (4) is produced in the portion (3) by superimposing two extruded profile segments (2a, 2b) and is shaped to a desired final shape by contact with a shaped surface of a mobile tool (5), with any excess material being automatically forced back out of the tool for removal, wherein the mobile tool (5) is applied to the portion (3) to be worked just after the extrusion die (D) has left the area of the second segment (2b) comprising said portion, in an extrusion station (E), without displacement, transfer or repositioning of the window (1);
   wherein the mobile tool (5) is applied to the portion (3) to be worked during a continuation of traveling of the extrusion die (D).

27. The process according to claim 26, wherein the material mass (4) is produced with the following stages:
   the extrusion die (D) is guided along a path of the first segment (2a) provided for the profiled strand (2) including the portion (3) to be worked;
   the extrusion die (D) is moved away from the window (1) and the extrusion die (D) is displaced relative to the window (1) towards a position close to the portion (3) to be worked, passing above the first segment (2a) proximate the portion (3) to be worked;
   the extrusion die (D) is guided along a path of the second segment (2b) of the profiled strand (2) proximate the portion (3) to be worked.

\* \* \* \* \*